United States Patent [19]

Antonov et al.

[11] Patent Number: 5,034,943
[45] Date of Patent: Jul. 23, 1991

[54] INFORMATION STORAGE DEVICE

[75] Inventors: Alexandr A. Antonov; Vyacheslav V. Petrov, both of Kiev, U.S.S.R.

[73] Assignee: Institut Problem Modelirovania V Energetike Akademii Nauk Ukrainskoi SSR, Kiev, U.S.S.R.

[21] Appl. No.: 265,872
[22] PCT Filed: Oct. 27, 1987
[86] PCT No.: PCT/SU87/00119
 § 371 Date: Aug. 12, 1988
 § 102(e) Date: Aug. 12, 1988
[87] PCT Pub. No.: WO88/04822
 PCT Pub. Date: Jun. 30, 1988

[30] Foreign Application Priority Data

Dec. 15, 1986 [SU] U.S.S.R. ............................. 4157161

[51] Int. Cl.$^5$ .................. G11B 7/00; G01D 15/10
[52] U.S. Cl. .................................. 369/260; 369/100; 369/111
[58] Field of Search .............. 369/213, 214, 260, 272, 369/273; 396/100, 101, 111; 346/76 L, 138, 160

[56] References Cited

U.S. PATENT DOCUMENTS

| 4,074,282 | 2/1978 | Balas, Jr. et al. | 346/76 LX |
| 4,535,434 | 8/1985 | Kishi . | |
| 4,542,495 | 9/1985 | Zieger et al. | 369/273 |
| 4,566,087 | 1/1986 | Kraft | 367/37 X |

FOREIGN PATENT DOCUMENTS 0166199 1/1986 European Pat. Off. .
1482668 8/1977 United Kingdom .

Primary Examiner—Stuart S. Levy
Assistant Examiner—Steven M. duBois
Attorney, Agent, or Firm—Lilling and Lilling

[57] ABSTRACT

An information storage device, has a container and at least two identical optical information carriers arranged coaxially inside the container and adapted for independent rotation in relation to each other. Each optical information carrier has a hollow cylindrical base made of a material transparent for laser radiation and a recording layer applied on this cylindrical base.

9 Claims, 2 Drawing Sheets

INFORMATION STORAGE DEVICE

BACKGROUND OF THE INVENTION

1. Field of the Invention

This invention relates to computers and, in particular, to information storage devices.

2. Description of the Related Art

Known in the art is an information storage device comprising a cylindrical information carrier with a recording layer applied thereon and a mirror disposed inside said carrier (JP, B, 53-2694).

Information can be recorded on this cylindrical information carrier and read therefrom by a laser beam using the mirror located inside the carrier.

The disadvantage of this prior art storage device consists in its low volume density of data recording, which can be explained by that, first, only one recording layer is used, second, this recording layer is left unprotected against environmental effects, and, third, the diameter of the cylindrical information carrier is relatively large since its positioning device is arranged inside said carrier.

Also known in the art is an information storage device wherein an optical information carrier comprises a hollow cylinder, a recording layer applied onto the external surface of this hollow cylinder, and a second cylinder external to the first cylinder and transparent to laser radiation. Two annular sealing elements are arranged between the cylinders so that a cylindrical closed space is formed between them and adjacent to the recording layer of the hollow cylinder (GB, B, 1580398).

The two cylinders are not permanently connected since the material of the recording layer requires development after information has been recorded thereon and, consequently, access to the material of this recording layer has to be provided by separating the two cylinders.

Another disadvantage of this prior art storage device is its low storage volume density since only one recording layer is used and this recording layer is not protected from the environment in any way and, consequently, can be covered by dirt, which affects the storage surface density of the recording layer.

SUMMARY OF THE INVENTION

The present invention is to provide an information storage device wherein the number of information carriers is increased without seriously changing the geometrical dimensions thereof in order to achieve a higher information storage volume density.

This is achieved by an information storage device equipped with a container where a first optical information carrier is rotatably arranged, this first optical information carrier having a hollow cylindrical base with a recording layer applied thereon and made of a material transparent to laser radiation. According to the invention, the device is also provided with at least one optical information carrier which is made identically to and mounted coaxially with said first optical information carrier so that they can rotate individually in relation to each other.

It is advisable that the container should be hermetically sealed in order to make the gap between cylindrical bases of coaxially arranged optical information carriers as close as possible.

Each optical information carrier should advisably be provided with a locking device preventing its rotation when the other optical carrier rotates.

It is advisable that the locking device of each optical information carrier should be provided with a pin secured in the butt end of the container to interact with a respective hole made in the blank flange available in the butt end of each cylindrical base, or should comprise a ring element made of a magnetic material and secured on the butt end of a respective cylindrical base, and a ring-shaped magnet for each ring element, which is secured in the nearest butt end of the container.

It is desirable that, in order to ensure individual rotation of each optical information carrier, each said optical information carrier should be equipped with an electric rotational drive having its rotor secured on the butt end of a respective cylindrical base, the one opposite to the butt end where the locking device is installed, and its stator disposed on the container, said stator being common for all electric drives.

In case an immersion lens is used for information recording and reading in this storage device, each optical information carrier should preferably be adapted for axial motion to address input information and the container should be filled with an immersion fluid and made twice longer as compared to the recording layer of any optical information carrier.

The container may be made of a material non-transparent to laser radiation and a window made of a material transparent to the laser radiation may be provided in the part of the container, which corresponds to the position of the lens for information recording.

It is also advisable that the recording layer of each cylindrical base which is external to a next base should have a cross-section shaped as an incomplete ring.

The storage device made according to the invention can help achieve a higher storage volume density because it has several recording layers arranged tightly in relation to one another.

BRIEF DESCRIPTION OF THE DRAWINGS

The invention will now be described in more detail with reference to specific embodiments and accompanying drawings wherein.

DESCRIPTION OF THE PREFERRED EMBODIMENTS

Figure 1:
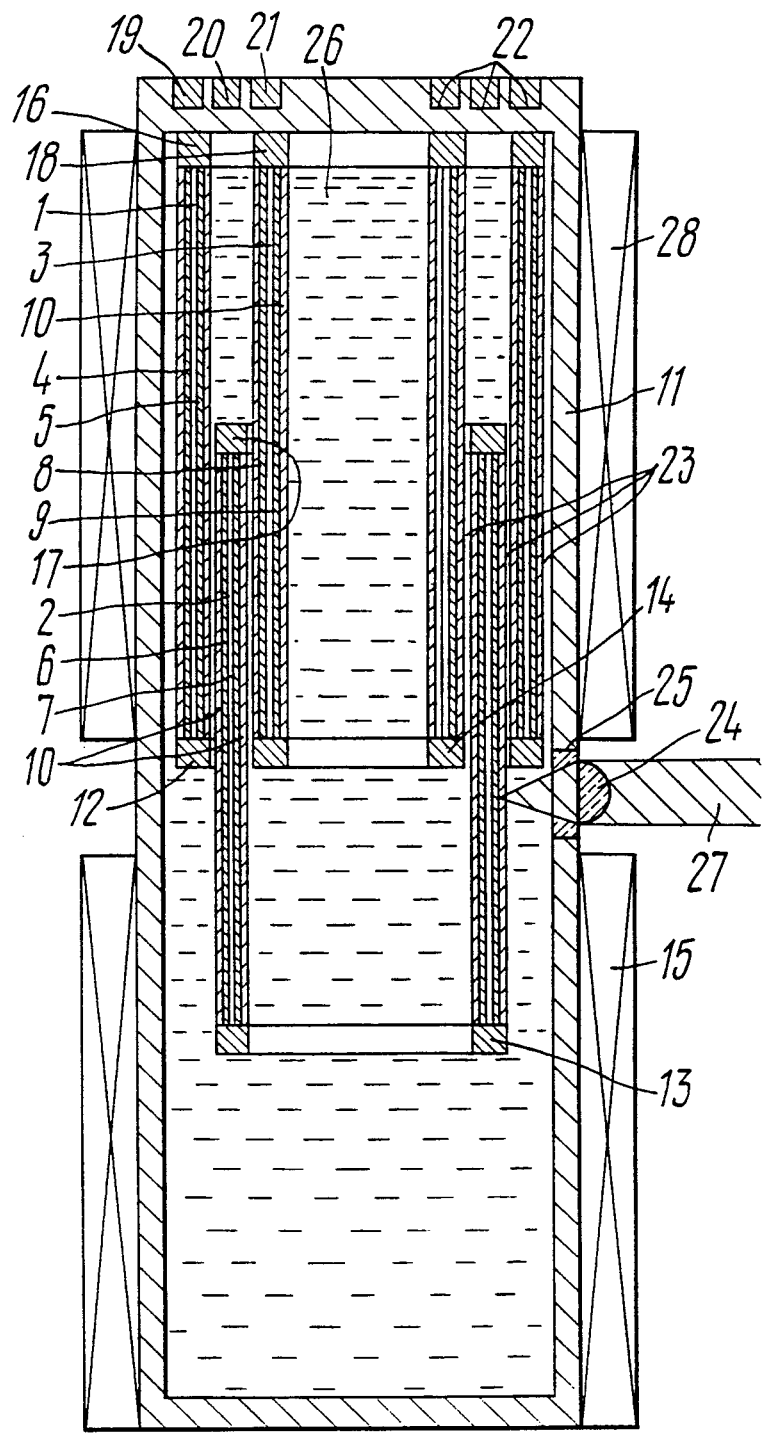
FIG. 1 shows a general longitudinal section view of an information storage device, according to the invention.
Figures 2, 3:
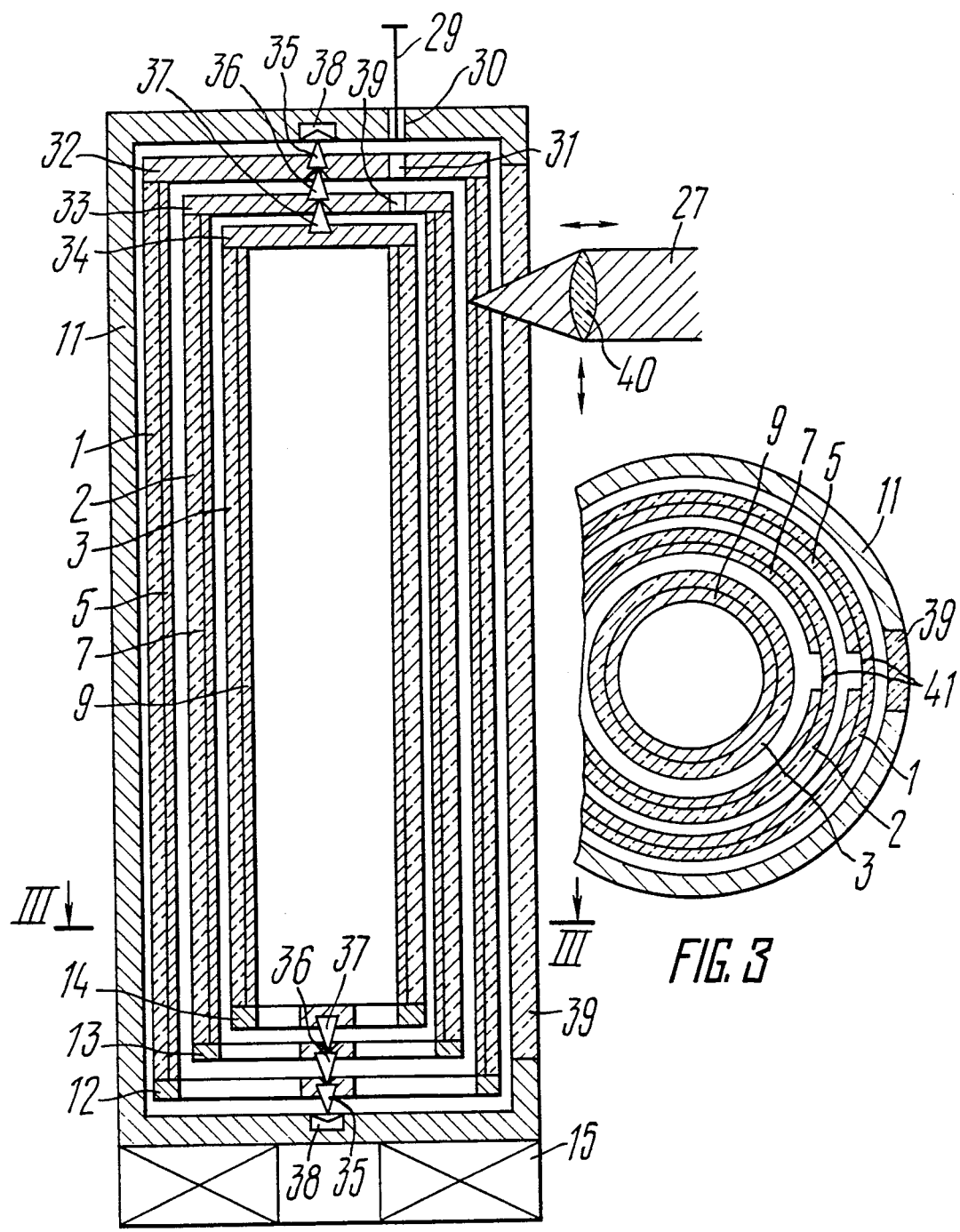
FIG. 2 shows a general longitudinal section view of another embodiment of an information storage device, according to the invention.
FIG. 3 shows a section view taken along line III—III of the embodiment of FIG. 2.

An information storage device comprises several identical optical information carriers. Embodiments having three such optical information carriers are shown in FIGS. 1 and 2, but the number of such carriers can be more and is restricted by technological conditions and manufacturing convenience. Each optical information carrier comprises a hollow cylindrical base 1, 2, 3 made of a material transparent to laser radiation, e.g. glass. Recording layers are applied on each cylindrical base 1, 2, 3. In the embodiment of FIG. 1 recording layers 4, 5, 6, 7, 8, 9 are applied on the external and internal surfaces of respective cylindrical bases 1-3. Each recording layer 4-9 is protected by a coating 10.

Cylindrical bases 1-3 are arranged coaxially inside a container 11 so that they can rotate individually, one in relation to another. To this end, each cylindrical base 1-3 is equipped with an individual electric drive having a rotor 12, 13, 14 secured on the butt end of a respective cylindrical base 1-3 and made, for example, as a permanent magnet magnetized radially in alternating directions, and a stator 15 disposed on the outer surface of the container 11 as shown in FIG. 1.

This stator 15 is made common for all electric drives for the sake of simplicity.

To ensure individual rotation of each optical information carrier and, at the same time, prevent rotation of other carriers, each optical information carrier is equipped with a locking device. In this embodiment of the invention, each locking device comprises a ring element 16, 17, 18 made of a magnetic material and secured on the butt end of a respective cylindrical base 1-3. A ring-shaped permanent magnetic 19, 20, 21 is disposed in the nearest butt end of the container 11 and secured in annular grooves 22 of the container 11.

The container 11 is hermetically sealed to minimize gaps 23 between the cylindrical bases 1-3. The container 11 is made of a material non-transparent to laser radiation.

The embodiment of the information storage device of FIG. 1 features an oil immersion lens 24 for information recording and reading, which is placed opposite a window 25 made in the wall of the container 11 of a material transparent to the laser radiation, e.g. glass. The inner space 26 of the container 11 is filled with an immersion fluid.

Optical information carriers can be axially displaced in relation to one another for addressing information. Referring to FIG. 1, the middle information carrier is advanced in relation to other carriers for recording information transmitted by a radiation flux 27. Any information carrier can be axially displaced by an electric drive made analogously to the rotational electric drive described above. Movable elements of the electric drive are rings 16-18 made of a magnetic material and magnetized in the axial direction. The stationary element of the drive is its stator 28. The length of the container 11 is twice the length of any recording layer 4-9.

The information storage device made according to the invention operates as follows.

The information optical carrier can be positioned by shifting this carrier along its axis of rotation while the lens 24 remains stationary. Rotation and axial displacement of a desired cylindrical optical information carrier is effected by electric drives.

At first, those information carriers which are not required for recording and reading operations are brought out of the field of vision of the lens 24 by means of the axial drive. The carrier is then locked in the extreme position by a respective ring-shaped magnetic 19-21. In this embodiment, this carrier is the external carrier on the cylindrical base 1, while recording is performed on the base 2 of the middle carrier. In case information is to be recorded on or read from the cylindrical base 3 of the inner carrier, the external and middle carriers are brought out of the field of vision of the lens 24. It should be noted that the middle carrier might be considered as an external one with respect to the inner carrier which is the working carrier in this example.

This means that only one carrier (2) of the three is to be positioned, while the other two (1, 3) are clamped by their locking devices made as ring-shaped magnets 19 and 21 and respective ring-shaped elements 16 and 18 as shown in FIG. 1.

Another embodiment of the information storage device shown in FIGS. 2 and 3 features three coaxially arranged optical information carriers. Each carrier has a hollow cylindrical base 1, 2, 3 with recording layers 5, 6, 7 applied on the inner surfaces thereof.

A pin 29 secured in the butt end of the container 11 extents through coaxial holes 30, 30', 31 to form therewith the locking devices (bases 1-3) of the information carrier.

Blind flanges 32, 33, 34 are provided at one end of each base 1-3, the blind flanges 32, 33 in the butt end of the container having said holes 30, 30', 31. In addition, each base 1-3 has supports 35, 36, 37 interacting with bearings 38 installed in the container 11.

Electric rotational drives of the information carriers 1-3 are made analogously to the drives in the previous embodiment (FIG. 1), the only difference being that the rotors 12-14 are disposed on the butt end of the container 11, opposite to the butt end on which the pin 29 of the locking devices is secured.

A window 39 made of a material transparent to laser radiation is provided in the side wall of the container 11 and, opposite said window 39, is a movable lens 40. Axial displacements of the lens 40 are used for focusing, while transverse displacement along the generatrix of optical information carriers is used for their positioning.

Recording layers 5 and 7 (FIG. 3) are applied on the internal surfaces of respective cylindrical bases 1-3 so that portions 41 free of the recording layer 5 or 7 are available to form windows transparent for laser radiation. This means that the cross-section of the recording layers 5 and 7 are incomplete rings. The locking devices of the cylindrical bases 1 and 2 ensure that the portions 41 match the window 39 in the container wall.

The information storage device shown in FIGS. 2 and 3 operates as follows.

According to the drawings, information is recorded on or read from the inner information carrier. In this case, the cylindrical bases 1 and 2 of other carriers are placed so that their portions 41 free of the recording layers 5 and 7 are positioned opposite the window 39 in the wall of the container 11. The pin 29 is engaged in the holes 30, 30', 31 and prevents the cylindrical bases 1 and 2 from rotating. The cylindrical base 3 rotates during recording (or reading) of information by its own electric drive which includes the rotor 14 and the stator 15.

During positioning of the information carrier on the cylindrical base 2, the pin 29 is engaged in the holes 30 and 31, while the portion 41 of the recording layer 5 is placed opposite the window 39 in the wall of the container 11.

The information storage device disclosed herein is characterized by a very high density of information recording and storage and its storage capacity can reach 1 gigabyte ($10^9$) with the following dimensions:
  thickness of each base 0.5-1 mm;
  internal diameter of the base of inner carrier 12-17 mm;
  internal diameter of outer carrier 17-22 mm;
  length of each carrier 100-150 mm.

This invention can be used as external memory for computers, e.g. when compiling databanks.

What is claimed is:

1. An information storage device, comprising:
   a container;
   a first optical information carrier rotatably mounted within the container and having a hollow cylindrical base, the base being transparent for laser radiation and having a recording layer applied thereon;
   at least one additional optical information carrier rotatably mounted within the container, and being identical to and arranged coaxially with the first optical information carrier; and
   means for providing respective independent rotation of the first carrier and each additional carrier.

2. An information storage device as claimed in claim 1, further comprising:
   an immersion oil lens for information recording and read-out; and
   means for providing axial motion of each optical information carrier, the container being filled with an immersion fluid and being twice as long as the recording layer of any optical information carrier.

3. An information storage device as claimed in claim 1, wherein the container is hermetically sealed.

4. An information storage device as claimed in claim 1, wherein the locking device of each optical information carrier comprises a pin secured in a butt end of the container and interacting with a respective hole provided in a blind flange covering a butt end of each cylindrical base.

5. An information storage device as claimed in claim 1, wherein the locking device of each optical information carrier comprises a ring-shaped element made of a magnetic material and secured on a butt end of a respective cylindrical base, and a ring-shaped magnet corresponding to each ring-shaped element, which is secured on a corresponding butt end of the container.

6. An information storage device as claimed in claim 1, 3, 4 or 5 wherein, in order to ensure that each optical information carrier is able to rotate independently, each optical information carrier is equipped with a rotational electric drive having a rotor secured on a butt end of a respective cylindrical base which is opposite the butt end on which the locking device is installed, and having a stator disposed on the container common to all electric drives.

7. An information storage device as claimed in claim 6, wherein the recording layer of each cylindrical base which is an external base in relation to another base, has a cross-section shaped like an incomplete ring.

8. An information storage device as claimed in claims 1, 2, 3, 4 or 5, wherein the recording layer of each cylindrical base which is an external base with respect to another base, has a cross-section shaped like an incomplete ring.

9. An information storage device as claimed in claim 2, wherein the container is made of a material which is non-transparent for laser radiation and provided with a window made of a material which is non-transparent for laser radiation and located in a part of the container which corresponds to a position of a lens employed for information recording and read-out.

* * * * *